Patented June 7, 1927.

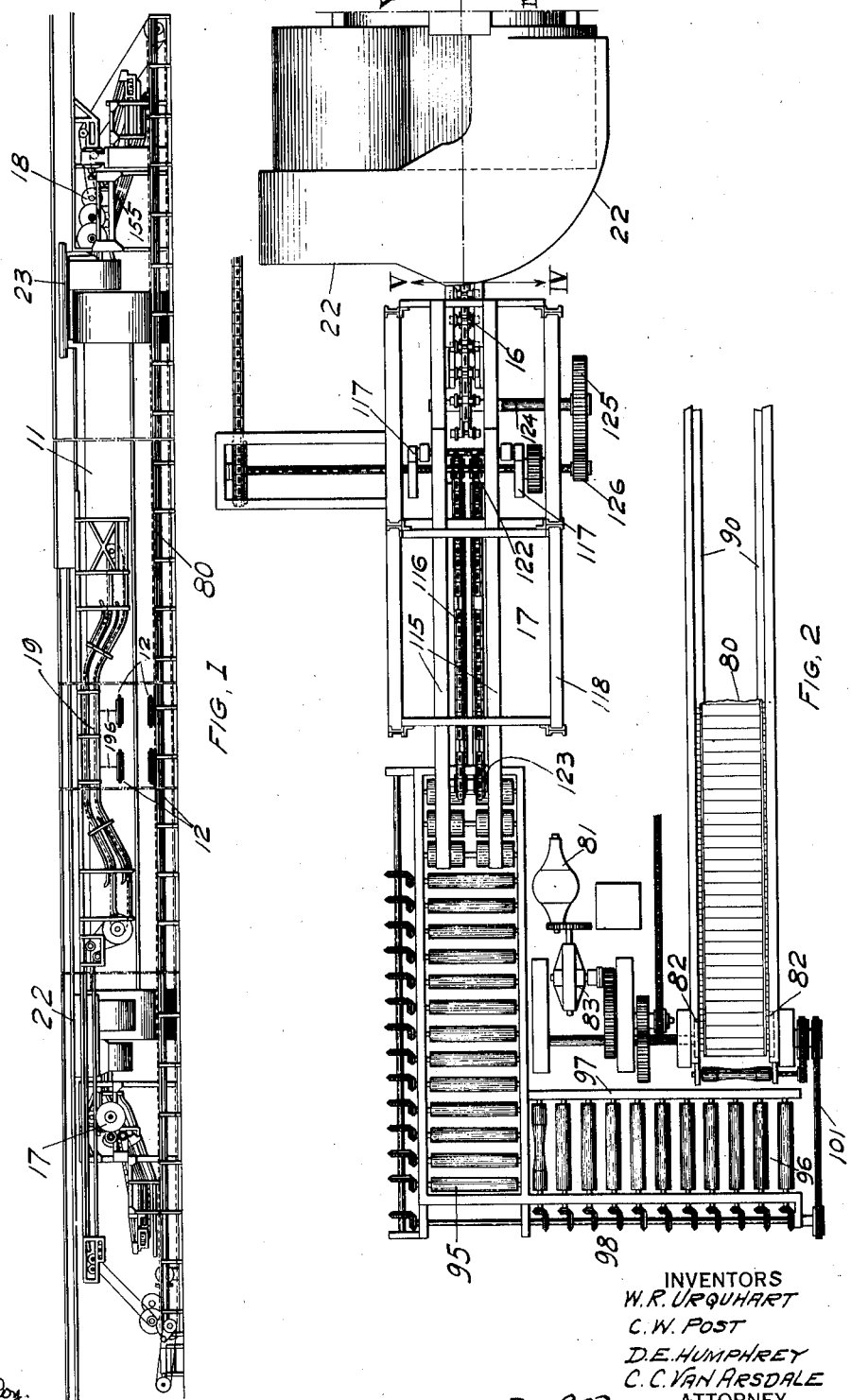

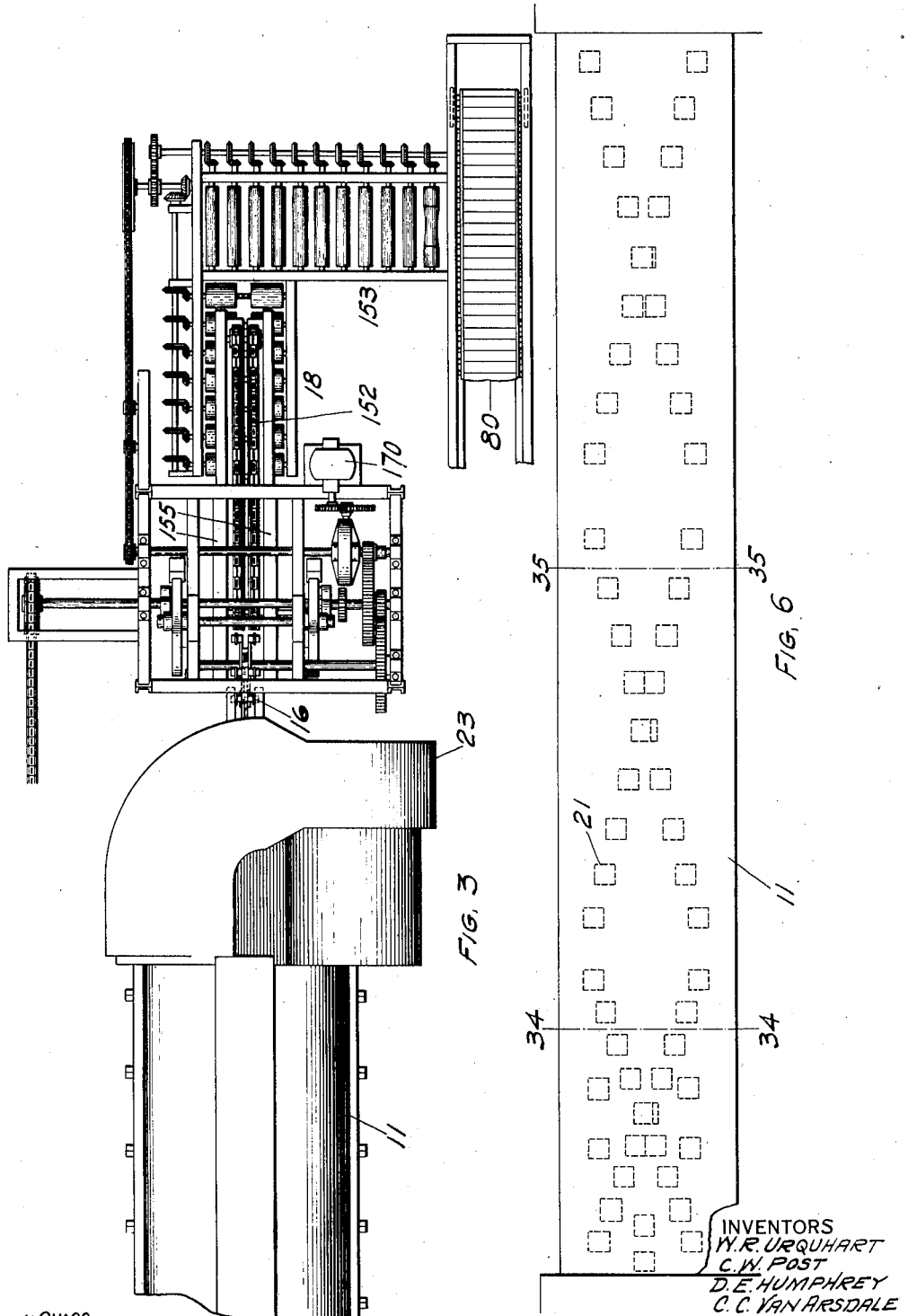

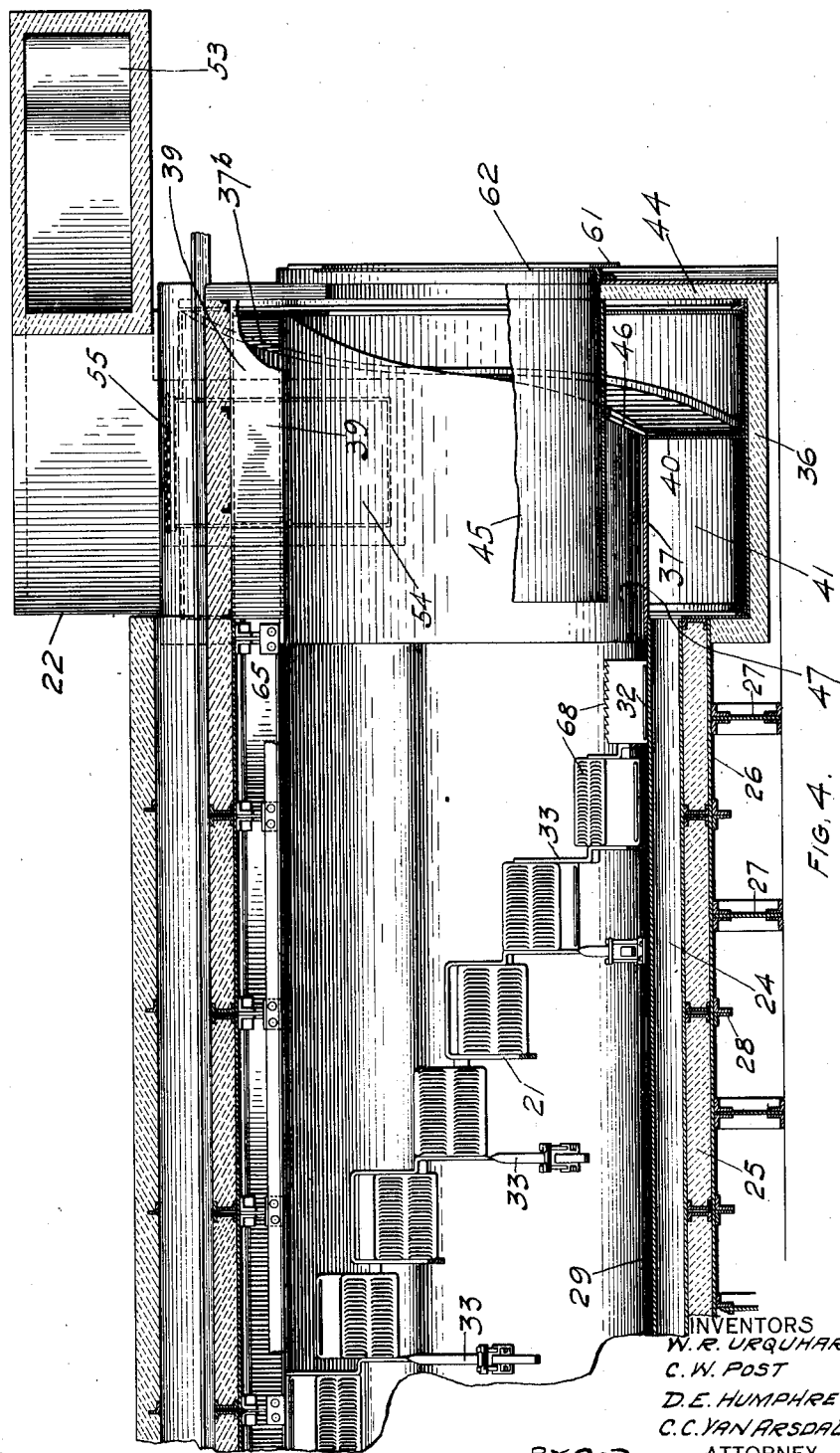

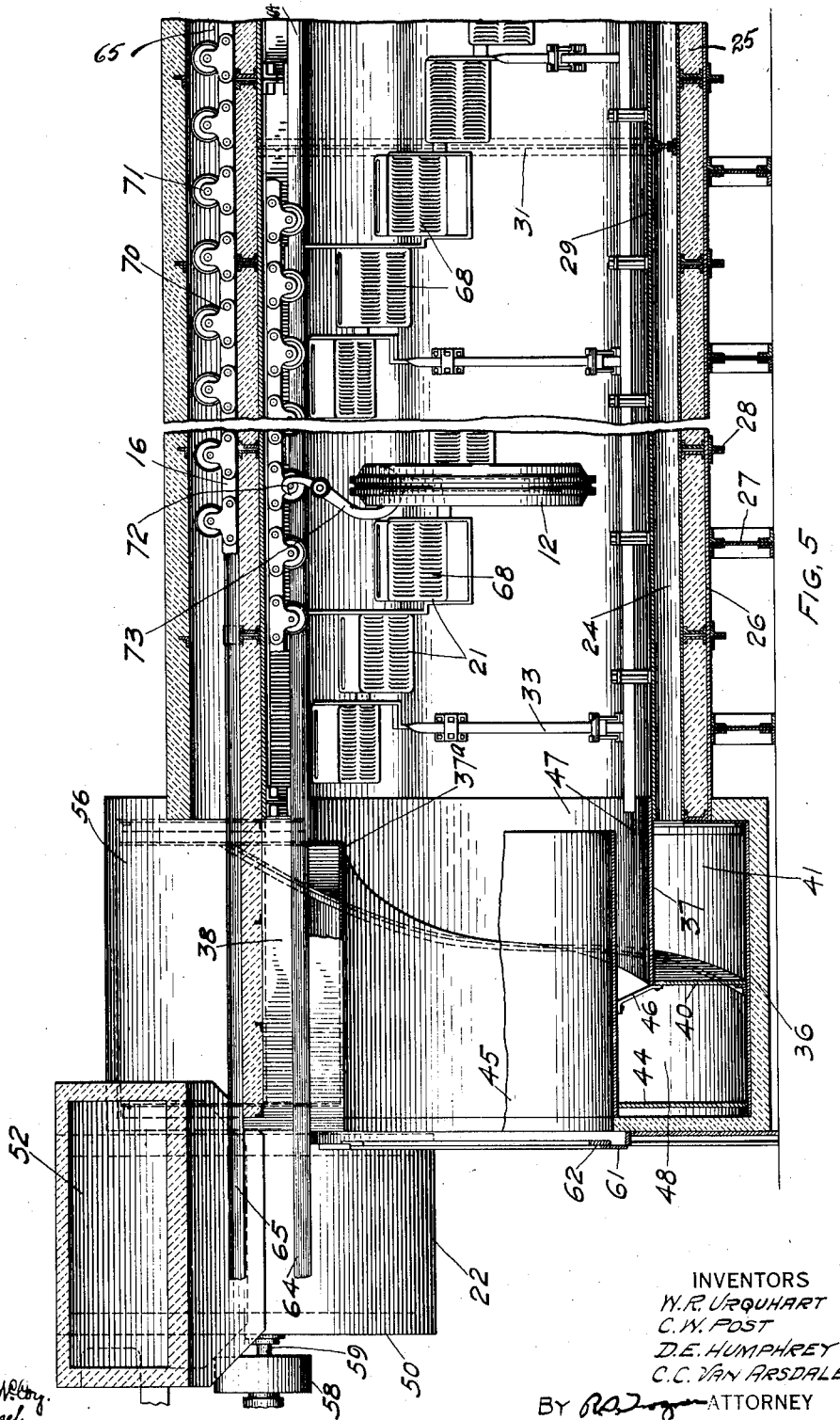

1,631,943

UNITED STATES PATENT OFFICE.

WILLIAM R. URQUHART, OF LOS ANGELES, CALIFORNIA, CLIFFORD W. POST, OF CHICAGO, ILLINOIS, DWIGHT E. HUMPHREY, OF CUYAHOGA FALLS, OHIO, AND CLARENCE C. VAN ARSDALE, OF AKRON, OHIO, ASSIGNORS TO THE GOODYEAR TIRE & RUBBER COMPANY, OF AKRON, OHIO, A CORPORATION OF OHIO.

METHOD OF TREATING RUBBER ARTICLES.

Original application filed October 18, 1920, Serial No. 417,755. Divided and this application filed September 5, 1922. Serial No. 586,215.

Our invention relates to a method of treating rubber articles by a continuous vulcanizing process, the various objects and advantages of which will be apparent from a perusal of the description in conjunction with the accompanying drawings wherein we have illustrated a preferred embodiment of our invention as it has been reduced to practice.

Our invention differs from the conventional practice in that it contemplates the use of a vulcanizing machine wherein rubber articles are transported through a vulcanizing oven in a continuous and regularly moving stream. An atmosphere of vulcanizing fluid through which the articles are moved, is maintained within the oven. The speed of travel of the rubber articles through the oven and the temperature of the oven are so adjusted that proper vulcanization results from the transportation of the rubber articles therethrough.

Throughout the various figures of the drawings, which illustrate a machine for practicing our invention, like symbols of reference designate corresponding parts. A more detailed illustration and description of this machine will be found in U. S. Letter Patent No. 1,422,065 of which this is a division.

Figure 1 of the accompanying drawings is a side elevational view, shown with parts broken away for the sake of clearness of illustration, of a vulcanizing machine constructed in accordance with our invention;

Figure 2 is a top plan view of a portion of the vulcanizing machine showing the entrance to the oven and portions of the conveying and driving mechanisms associated therewith.

Figure 3 is a top plan view of the conveyor mechanism situated at the unloading or exit end of the oven;

Figures 4 and 5 are, respectively, vertical sectional views looking in the direction of the arrows IV and V of Figure 2, and illustrating, in sectional view with parts broken away for clearness of illustration, both the right and left-hand sections of the entrance to the oven; and Figure 6 is a side elevational view diagrammatically showing the arrangement of heating elements within the oven.

A preferred form of vulcanizing apparatus by means of which our invention is practiced is shown in the drawings. A tubular oven 11 provides an enclosure through which a continuous stream of rubber articles are moved by a conveyor mechanism which includes an overhead oven conveyor 16, a loading section 17, an unloading portion 18 and a mold-separating portion 19.

The curing oven 11 is a relatively long tubular structure of substantially circular cross section which is heated by means of a plurality of suitably arranged electrical heating units 21 through which air is circulated by circulation manifold and fan mechanism 22 and 23 that are placed at the respective ends of the oven and which supply air or other vulcanizing fluid through longitudinal ducts 24 to the electrical heating units 21 and thence to the interior of the oven.

The curing oven, right and left-hand vertical sectional views of which, are respectively shown in Figures 4 and 5, has an outer wall of refractory material such as brick that is adapted to prevent the dissipation of heat or the escape of fluid from the oven. The outer wall is cradled in a semi-cylindrical structure 26, of sheet metal, that is supported by a plurality of equally spaced brackets 27.

Interposed circular ribs 28 are utilized to strengthen the wall 25 of the oven. The oven also has an inner shell 29, preferably of sheet metal, which is spaced from the outer wall 25 a sufficient distance to provide a series of longitudinal ducts 24 that are separated from each other by longitudinal partitions which extend from end to end of the oven. A suitable transverse partition 31 extends between the walls 25 and 24 at substantially the center of the oven, to divide the longitudinal channels or ducts. Each section of the oven thus has its independent system of longitudinal circulation ducts.

The electrical heating elements 21 are spirally arranged within the oven and are mounted on the inner wall 29, each heating element being mounted directly over the opening into the oven of one of the longitudinal ducts 24. A damper 32 is placed at the base of each heating element to afford means for controlling the quantity of fluid that passes into the oven from the longitudinal ducts through communicating apertures in the inner shell 29 of the oven, over which the respective heating elements are mounted.

Figure 6 schematically illustrates the general arrangement of the heating elements within the oven. By arranging the heating elements spirally, one spiral starting at the top and one at the bottom of the oven and continuing throughout its length in two spirals within the oven, each circulation duct is adapted to supply air or other fluid to a proportionate number of heating elements, thus insuring a uniform and equal distribution of the circulating medium through the oven.

The heating elements may be of any conventional design and are, therefore, merely indicated as a plurality of units 21 that are supplied with electrical energy through suitable strap connectors 33. Each of the heating units has a series of deflecting plates 68 which deflect the circulated medium to cause it to move either spirally or longitudinally toward the ends of the oven according to the position in which the plates are placed. This insures that all portions of the oven will be uniformly heated.

In order that the rubber articles being treated may be brought to the vulcanizing temperature as quickly as is consistent with the proper operation of the oven, a relatively large number of heaters are grouped in the entrance section of the oven by more closely spacing the heating units at this point than in other portions of the oven and by the addition of auxiliary heating units to this section of the oven. This arrangement provides for a greatly increased local heating effect at the entrance to the oven.

The heat units for the oven are arranged in power groups, as indicated by the dotted lines 34 and 35 of Figure 6, each group being supplied by an independent set of bus bars and embodying substantially the same number of heating units in order that substantially the same quantity of electrical energy may be consumed by each power group. Each power group of heating units is independent of the other groups and is controlled automatically by a potentiometer heat regulator of conventional design that is governed through suitable thermocouples arranged within the oven. Since apparatus of this nature is well known in the electrical art and since its system of connection and operation will be apparent to those skilled in such work, only a general description and schematic illustration thereof is deemed necessary for a complete understanding of its relation to our invention.

Since each power unit is separately supplied with electrical energy and is separately controlled, it will be apparent that each of these zones of the oven may be independently maintained at a predetermined temperature.

The heat that is developed within each of the units is transferred to the oven by radiation and the circulating medium that is forced through the longitudinal channels 24 and the heating elements 21 into the oven. The continuous circulation of this air in a predetermined path is effected by means of the manifold and fan mechanism 22 and 23, that are identical in structure and are disposed at the respective ends of the oven. Each of the circulating mechanisms supplies air or other vulcanizing medium to the corresponding portion of the oven since the sets of longitudinal ducts 24 are separated midway of the oven by the partition 31.

The circulation unit 22 is shown in sectional view in Figures 4 and 5 that are respectively taken in a left-hand and in a right-hand direction from a central vertical plane extending longitudinally of the oven as indicated by the dotted lines and the associated arrows IV—IV and V—V of Figure 2 of the drawings.

Referring particularly to these figures, the circulation apparatus 22 comprises a cylindrical shell 36 that is of larger diameter than the outer wall 25 of the oven and that forms a continuation thereof. A metal shell 37, which constitutes a continuation of the inner oven shell 29, is of uniformly tapered width from its narrow edge 37$^a$ (Figure 5) where it joins a vertical longitudinal plate 38, to its widest portion 37$^b$ (Fig. 4) that terminates at a vertical plate 39. A radial partition 40 extends from the outer edge of the shell 37 to the wall 36 of the ventilation cap to form a pressure manifold 41 that communicates with each of the ducts 24 and that has a tapered section which provides for a uniform circulation of fluid through the several channels 24. The outer end of the cylindrical shell 36 is partially closed by a radial wall 44 and a split cylindrical shell 45 that is of less diameter than the inner wall 29 of the oven and that extends only a short distance into the oven. The shell 45 is spaced from the shell 37 by a series of brackets 46 that serve to support the inner edge of the shell 45 and provide an opening 47 through which fluid may be exhausted from the oven. The split cylinder 45 is also connected to the plates 38 and 39 at the top of the oven.

The shell 45, the wall 44, the cylinder 36 and the partition 40, together define an exhaust manifold 48 of tapered section that serves to exhaust the circulated medium from the oven through the opening 47.

A fan 50, of conventional design, has a pressure port 52 that communicates with the pressure manifold 41 through an angular channel 53 and an aperture 54, shown in dotted outline, that is formed in the cylindrical shell 36 of the ventilation cap. A damper 55 is interposed between the pressure port of the fan and the angular channel 53 to provide means for regulating the flow of air to the pressure manifold. The fan 50 also has an exhaust port 56 which communicates with the exhaust manifold 48. The fan 50 is driven from a pulley wheel 58 that is mounted on a fan shaft 59 carried by an overhead bracket.

Each end of the oven has a plate 61 fitted thereon which carries a flexible annular disc 62, of fabric or other material, that serves, in conjunction with the annular tire casing molds 12, which traverse the oven, to partially seal the oven openings.

The oven also has a pair of overhead conveyor tracks 64 and 65 extending therethrough for supporting the overhead chain conveyor 16 from which the articles that are subjected to the curing process are suspended in any conventional manner during their passage through the oven.

The oven conveyor comprises a chain 70 that is supported from a series of rollers 71 that traverse the overhead tracks 64 and 65. Transverse pins 72 provide means for supporting the carriers 73.

The articles to be vulcanized are preferably confined in molds 12 that are suspended from the overhead oven conveyor 16 by means of a series of carriers 73.

A bed conveyor 80, of conventional linkbelt type, extends from the "unloading" conveyor mechanism 18 to the "loading" mechanism 17 and serves to return the molds 12 from the exit to the entrance of the oven during their continuous cycle of operation.

A driving motor 81 is connected to a pair of driving sprockets 82 for operating the conveyor 80 by means of a gear train embodying a worm gear set 83. A pair of horizontal tracks 90 constitutes a bed on which the conveyor travels.

The molds 12 are received from the bed conveyor 80 by a roller conveyor 95 of conventional design that forms a portion of the loading mechanism 17.

The loading mechanism, embodies a pair of spaced tracks 115 along which the mold carriers 73 are conveyed by an inclined chain conveyor 116. A cam mechanism 117 serves to transport the molds from the chain conveyor 116 to the overhead oven conveyor 16.

The chain conveyor 116 is of conventional design and extends over a pair of spaced driving sprockets 122 at its upper end and a pair of idler sprockets 123 at its lower end. The conveyor chains 116 are driven at a uniform rate by the sprockets 122 from a jack shaft 124 through a pair of intermediate gear wheels 125 and 126 that drive the spur shaft upon which the sprockets 122 are mounted.

The inclined tracks 115 are supported from a structural framework 118 and have their lower ends spaced a sufficient distance above the roller conveyor 95 to permit the mold to move beneath the lower ends of the track and to enable the mold carriers 73 to travel along the tracks 115 and to drag the corresponding molds thereafter. The conveyor chains 116, drag the carriers and the associated molds up the inclined tracks during the advancing movement of the conveyor chain. When the molds travel a sufficient distance up the inclined tracks, they swing free from the roller conveyor and are suspended from the tracks 115 by the carriers 73. When the carriers 73 are lifted to the top of the inclined chains 116 they are automatically transferred to the overhead conveyor chain 16, from which they are suspended in the manner shown in Figure 5 of the drawings.

As the suspended molds emerge from the oven, the carriers engage an upwardly inclined track 155 that serves to lift the carriers free from the conveyor chain and to permit them to slide down the track 155, the molds are thus delivered to the roller conveyor 153.

The roller conveyor 153 conducts the molds from the unloading end of the conveyor portion 18 to the bed conveyor 80 by means of which they are carried to the mold-separating portion 19 of the conveyor system, as indicated in Fig. 1 of the drawings. The separating portion of the conveyor is of conventional design embodying an overhead conveyor 195 that carries a series of hooks 196 from which the upper portion of the mold sections are suspended, thus leaving the lower portion of the opened mold in position on the bed conveyor. The cured tire casing, or other rubber article, is removed from the mold and a new, uncured article placed therein. When the separated mold sections move a sufficient distance along the conveying section 19, the mold sections are again mated and secured together for another cycle of treatment in the oven.

The operation of this machine and the practice of our invention may best be described by tracing the movement of an individual mold, which has been supplied with an uncured rubber article, through the curing oven. Such a mold 12 is carried by the bed conveyor 80 from the mold assembly unit 19 to the roller conveyor 95 and delivered to the loading mechanism 17 at the entrance to the curing oven. The mold is here engaged by the carrier 73 and dragged over the remaining rollers of the conveyor 95 until the mold swings free from the bed conveying mechanism and is supported on the inclined rails 115 of the loading mechanism. The conveying chains 116 move the mold sections up the inclined tracks 115 to a position where the mold is swung from the transverse pins 72 of the overhead oven conveyor and carried through the oven in such position.

It is assumed that the oven is heated to a proper temperature by means of the electrical heating units and that the temperature is maintained within predetermined limits by the operation of a potentiometer temperature regulator. The heated air, or other vulcanizing medium, is circulated through the oven by the operation of the fan mechanisms 22 and 23. The length of the oven and the speed of operation of the overhead conveyor chain 16 are so related that the rubber articles are maintained in the atmosphere of the oven a sufficient time to completely vulcanize or cure the articles being treated.

After traversing the oven, the mold is delivered to the unloading mechanism 18 and moved by the roller conveyor 153 to the bed conveyor 80. The bed conveyor 80 conducts the mold, with its cured rubber article, to the mold opening portion of the conveyor 19 where the upper portion of the mold is lifted from the lower portion and the cured rubber article is removed therefrom. The molds are now in condition to receive another uncured article and to again traverse the oven in their continuous cycle of operation.

The various changes and alterations that may be made in a structure of this nature will be apparent. However, it is deemed desirable to set forth a few of the variations that may be made, such, for instance, as the circulation of an atmosphere through the oven that would effect certain changes in the rubber article or that would recover solvent used in the manufacture of such articles or for reasons of like nature. It may also be desirable at times to avoid the use of metallic molds and to conduct the articles through the oven without the encasing mold structure.

Particular mention should be made of the increased temperature that is employed at the entrance to the oven in order that the articles to be vulcanized may more quickly be heated to a vulcanizing temperature. By separating the various heating elements of the oven into independent groups, the successive temperatures to which the article is exposed can be accurately controlled.

Although we have described a single method of practicing our invention, there are obviously other forms of mechanism that may be as effective as those disclosed and we desire, therefore, that only such limitations shall be imposed as are indicated in the accompanying claims, it being our intention to protect our invention as fully and as completely as the prior art may permit.

What we claim is:

1. The continuous method of treating rubber articles which consists in moving the articles progressively and successively through a circulated medium of heating fluid, different zones of which are maintained at materially different temperatures.

2. The continuous method of treating rubber articles which consists in moving the articles progressively and successively through a zone of relatively high vulcanizing temperature, then through a zone of materially lower vulcanizing temperature.

3. The continuous method of treating rubber articles which consists in moving the articles progressively and successively through a zone of relatively high temperature into a zone of materially lower vulcanizing temperature, said article being transferred from the first zone to the second zone when the temperature of the article is raised to substantially the temperature of the second zone.

4. The continuous method of treating rubber articles which consists in moving the articles progressively and successively through a zone of relatively high temperature into a zone of materially lower vulcanizing temperature, said articles being enveloped during such movement by a circulated medium of heating fluid.

5. The method of vulcanizing rubber articles that comprises moving the articles through successive zones of radiant heat, the degree of heat being substantially different in one zone from that in the succeeding zone.

In witness whereof, we have hereunto signed our names.

WILLIAM R. URQUHART.
CLIFFORD W. POST.
DWIGHT E. HUMPHREY.
CLARENCE C. VAN ARSDALE.